United States Patent
Krishnaswamy et al.

(10) Patent No.: US 8,189,486 B2
(45) Date of Patent: May 29, 2012

(54) METHOD AND SYSTEM FOR PROVIDING HOLISTIC, ITERATIVE, RULE-BASED TRAFFIC MANAGEMENT

(75) Inventors: Murali Krishnaswamy, Piscataway, NJ (US); Sambasiva R. Bhatta, Tampa, FL (US); Sheldon G. Colaco, Tampa, FL (US); Timothy R. Hunniecutt, Brandon, FL (US); Ashok Kumar, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 648 days.

(21) Appl. No.: 12/057,793

(22) Filed: Mar. 28, 2008

(65) Prior Publication Data
US 2009/0245115 A1    Oct. 1, 2009

(51) Int. Cl.
*G01R 31/08* (2006.01)
(52) U.S. Cl. .......................................... 370/242
(58) Field of Classification Search .............. 370/242, 370/235
See application file for complete search history.

(56) References Cited

U.S. PATENT DOCUMENTS

| | | | |
|---|---|---|---|
| 7,242,668 B2* | 7/2007 | Kan et al. | 370/234 |
| 7,609,637 B2* | 10/2009 | Doshi et al. | 370/235 |
| 2004/0193709 A1* | 9/2004 | Selvaggi et al. | 709/224 |
| 2005/0071453 A1* | 3/2005 | Ellis et al. | 709/223 |
| 2008/0002590 A1* | 1/2008 | Thomas et al. | 370/242 |
| 2008/0052394 A1* | 2/2008 | Bugenhagen et al. | 709/224 |
| 2010/0235357 A1* | 9/2010 | Briscoe et al. | 707/737 |

* cited by examiner

*Primary Examiner* — Derrick Ferris
*Assistant Examiner* — Angel Brockman (57) ABSTRACT

An approach is provided for monitoring traffic over a network link that is used to provide one or more services to one or more customers. A determination is made regarding whether a failure mode of the network link has occurred by comparing the monitored traffic to predetermined bandwidth criteria. A corrective action to be taken in response to the failure mode is selected, where selection of the corrective action to be taken is determined based on the failure mode. Further corrective actions selected iteratively from a predetermined list of successive actions are applied until the failure modes are addressed.

21 Claims, 9 Drawing Sheets

| | FAILURE MODES |
|---|---|
| 1 | Customer(s) not receiving SLA requirements for a few services (e.g., voice, video, or data services). |
| 2 | Customer(s) not receiving SLA requirements for all services. |
| 3 | Not meeting QoS guarantees for a few services. |
| 4 | Not meeting QoS guarantees for all services. |
| 5 | Bandwidth usage of any service crossing threshold value, but total bandwidth usage by all services less than total link bandwidth. |
| 6 | Bandwidth usage of any service crossing threshold value, and total bandwidth usage by all services greater than or equal to total link bandwidth. |

| | FAILURE MODES |
|---|---|
| 1 | Customer(s) not receiving SLA requirements for a few services (e.g., voice, video, or data services). |
| 2 | Customer(s) not receiving SLA requirements for all services. |
| 3 | Not meeting QoS guarantees for a few services. |
| 4 | Not meeting QoS guarantees for all services. |
| 5 | Bandwidth usage of any service crossing threshold value, but total bandwidth usage by all services less than total link bandwidth. |
| 6 | Bandwidth usage of any service crossing threshold value, and total bandwidth usage by all services greater than or equal to total link bandwidth. |

FIG. 6

| | CORRECTIVE ACTION |
|---|---|
| 1 | No action required. |
| 2 | Increase SLA bandwidth for the affected customer(s) and service(s). |
| 3 | Increase QoS priority for the affected service(s). |
| 4 | Increase CAC bandwidth for the affected service(s). |
| 5 | Decrease over-subscription factor for the affected service(s). |
| 6 | Replace the existing link with a higher capacity link or introduce additional link(s). |

FIG. 7

| Case No. | Failure Mode | Frequency of Occurrence | Customer SLA Category | First Corrective Action | Second Corrective Action | Third Corrective Action | Fourth Corrective Action | Fifth Corrective Action | Remarks |
|---|---|---|---|---|---|---|---|---|---|
| 1. | 1 | 1 (rare), 2 (frequent) | 1 (high) | 2 | 3 | 4 | 5 | 6 | Increase SLA bandwidth, QoS priority, etc. |
| 2. | 1 | 1 | 2 (middle), 3 (low) | 1 | 1 | 1 | 1 | 1 | Ignore. |
| 3. | 1 | 2 | 2, 3 | 1 | 2 | 3 | 4 | 5 | Ignore. Otherwise as in Case No. 1. |
| 4. | 2 | 1, 2 | 1 | 4 | 5 | 6 | 6 | 6 | Increase CAC bandwidth, decrease over-subscription, etc. |
| 5. | 2 | 1 | 2, 3 | 1 | 1 | 1 | 1 | 1 | Ignore. |
| 6. | 2 | 2 | 2, 3 | 1 | 4 | 5 | 6 | 6 | Ignore. Otherwise as in Case No. 4. |
| 7. | 3 | 1 | N/A | 1 | 1 | 1 | 1 | 1 | Ignore. |
| 8. | 3 | 2 | N/A | 3 | 4 | 5 | 6 | 6 | Increase QoS priority, increase CAC bandwidth, etc. |
| 9. | 4 | 1, 2 | N/A | 4 | 5 | 6 | 6 | 6 | Increase CAC bandwidth, decrease over-subscription, etc. |
| 10. | 5 | 1 | N/A | 1 | 4 | 5 | 6 | 6 | Ignore. Otherwise increase CAC bandwidth, etc. |
| 11. | 5 | 2 | N/A | 4 | 5 | 6 | 6 | 6 | Increase CAC bandwidth, decrease over-subscription, etc. |
| 12. | 6 | 1 | N/A | 1 | 5 | 6 | 6 | 6 | Ignore. Otherwise decrease over-subscription, etc. |
| 13. | 6 | 2 | N/A | 5 | 6 | 6 | 6 | 6 | Decrease over-subscription, new link. |

FIG. 8

FIG. 9

METHOD AND SYSTEM FOR PROVIDING HOLISTIC, ITERATIVE, RULE-BASED TRAFFIC MANAGEMENT

BACKGROUND OF THE INVENTION

Network links used to carry information traffic throughout a network by nature have limited capacity to carry traffic. Network operators must attempt to ensure both quality of service (QoS) guarantees for services provided, and service level agreement (SLA) requirements to customers. When an SLA requirement and/or a QoS guarantee are not met, then corrective action may be necessary.

As the level of traffic utilizing a network link can greatly fluctuate at any given time, and trends in usage can vary over periods of time, IP networks must be able to adapt to changing trends in traffic on the network in order to efficiently utilize resources of the network, and ensure QoS and satisfy SLA requirements. While network operators can reconfigure the network in such a way as to increase the overall capacity of the network, due to the costs associated with increasing capacity (such as by adding new network elements and links), it is desirable to not unnecessarily increase capacity.

Therefore, there is a need for monitoring of the network for problems associated with SLA requirements and QoS guarantees, analyze such problems, and provide prompt and efficient solutions to such problems.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for providing service level agreement (SLA), quality of service (QoS), and bandwidth management in a multi-service network are described in this document. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Today communication networks transfer a variety of different types of information between service providers and customers. Such networks can carry voice, video, and data traffic to provide a broad range of services to customers. For example, various computer networks are used to interconnect computing devices (personal computers, workstations, peripheral devices, etc.) for use in both personal and business settings. Businesses may utilize computer networks that cover broad geographical areas and utilize a collection of computer networking devices (e.g., routers, switches, hubs, etc.) for use by their employees and to interconnect various remote offices. Also, various service providers may provide multiple services to customers for entertainment or business-related reasons through devices capable of processing signals for presentation to a customer, such as a set-top box (STB), a home communication terminal (HCT), a digital home communication terminal (DHCT), a stand-alone personal video recorder (PVR), a television set, a digital video disc (DVD) player, a video-enabled phone, a video-enabled personal digital assistant (PDA), and/or a personal computer (PC), as well as other like technologies and customer premises equipment (CPE).

In certain instances it is advantageous to provide a unified multi-service network for voice, video, and data traffic to provide a rich set of services in an economical manner. For example, a multi-service network can be used by a service provider to provide customers with augmented data and/or video content to provide, e.g., sports coverage, weather forecasts, traffic reports, commentary, community service information, etc., and augmented content, e.g., advertisements, broadcasts, video-on-demand (VOD), interactive television programming guides, links, marketplace information, etc. In this manner, a customer of the service may seamlessly obtain traditional IP-based data combined with supplemental media rich information. Such a multi-service network could also be used to provide the customer with the ability to use the network as a telephone using voice over internet protocol (VoIP) transmissions.

A unified network for voice, data and video traffic, and a rich set of services based on such traffic, offers enormous cost savings in building and running such a multi-service network. A multi-service network can be a gateway for numerous types of traffic, for example, voice traffic that can include VoIP carried over IP, Ethernet, Asynchronous Transfer Mode (ATM), passive optical network (PON), etc. networks, as well as traffic that is carried as time-division multiplexing (TDM) over ATM, PON, etc. networks; video traffic that can include traffic that is carried in a packetized format like MPEG-2 (Motion Pictures Expert Group) over IP, Ethernet, ATM, PON, etc., such as VOD, IPTV, video games, etc.; and data traffic that can include all types of data including the signaling information for voice traffic and video traffic.

Additionally, a multi-service network can provide a wide variety of types of services that are applications based on a particular traffic type (e.g., VOD, IPTV, etc. for video traffic, etc.). The multi-service network can also accommodate different requirements for the same traffic type; for example, the network can accommodate low latency data traffic for storage area networks as compared to other types of data traffic, or VoIP traffic can be classified into multiple service types based on business and residential quality, etc. In the past, service classification could be limited to the three traffic types; however, this is no longer the case. Now each service typically needs its own specific requirements to be met.

Network links used to carry the information traffic throughout the network by nature have limited capacity to carry traffic. Network operators can configure the network (e.g., by adding links, by replacing a link with a link of increased capacity, etc.) in such a way as to increase the overall capacity of the network; however, due to the costs associated with increasing capacity (such as by adding new network elements and links), it is desirable to not unnecessarily increase capacity. Another factor that the network operators must consider when configuring the network is the need to provide services to customers in a manner that assures integrity of the information being transmitted and quality of the service being provided to the customer. Network operators have to ensure that the network meets customer SLA requirements and QoS guarantees, for example, by ensuring that the network has sufficient bandwidth to handle the traffic on the network, and that the bandwidth is appropriately apportioned to services and/or customers. When an SLA requirement and/or a QoS guarantee is not met or crosses a threshold, then a corrective action (e.g., reallocation of resources, addition and/or upgrade of resources, etc.) may be necessary.

The growth or contraction of customer usage of a network over time can have serious effects on the ability of a network to satisfy SLA requirements and/or QoS guarantees. For example, the growth of the number of employees in a company, and thus the number of employees utilizing a computing network of the company, can increase over time to a point where the network link(s) is being over-utilized and data transmission slows. As the data communication amongst units of a business is important to the operation of the business, fast and efficient flow of data throughout the business is essential. Thus, such a situation can have serious consequences to the business.

With some types of customers and/or services, changes in usage of the network can be rapid in nature. Internet protocol (IP) networks are generally bursty in nature. The level of traffic (e.g. voice, video, data, etc.) utilizing a network link can greatly fluctuate at any given time, and trends in usage can vary over periods of time. IP networks must be able to adapt to changing trends in traffic on the network in order to efficiently utilize resources of the network, and ensure QoS guarantees and satisfy SLA requirements.

Physical changes to the network, such as upgrading of network link hardware, the addition of new network links, etc., that are needed to respond to changes in traffic on the network require planning and time to implement. Thus, it is important to detect and address problems regarding growth in usage as quickly and efficiently as possible.

Figure 1:
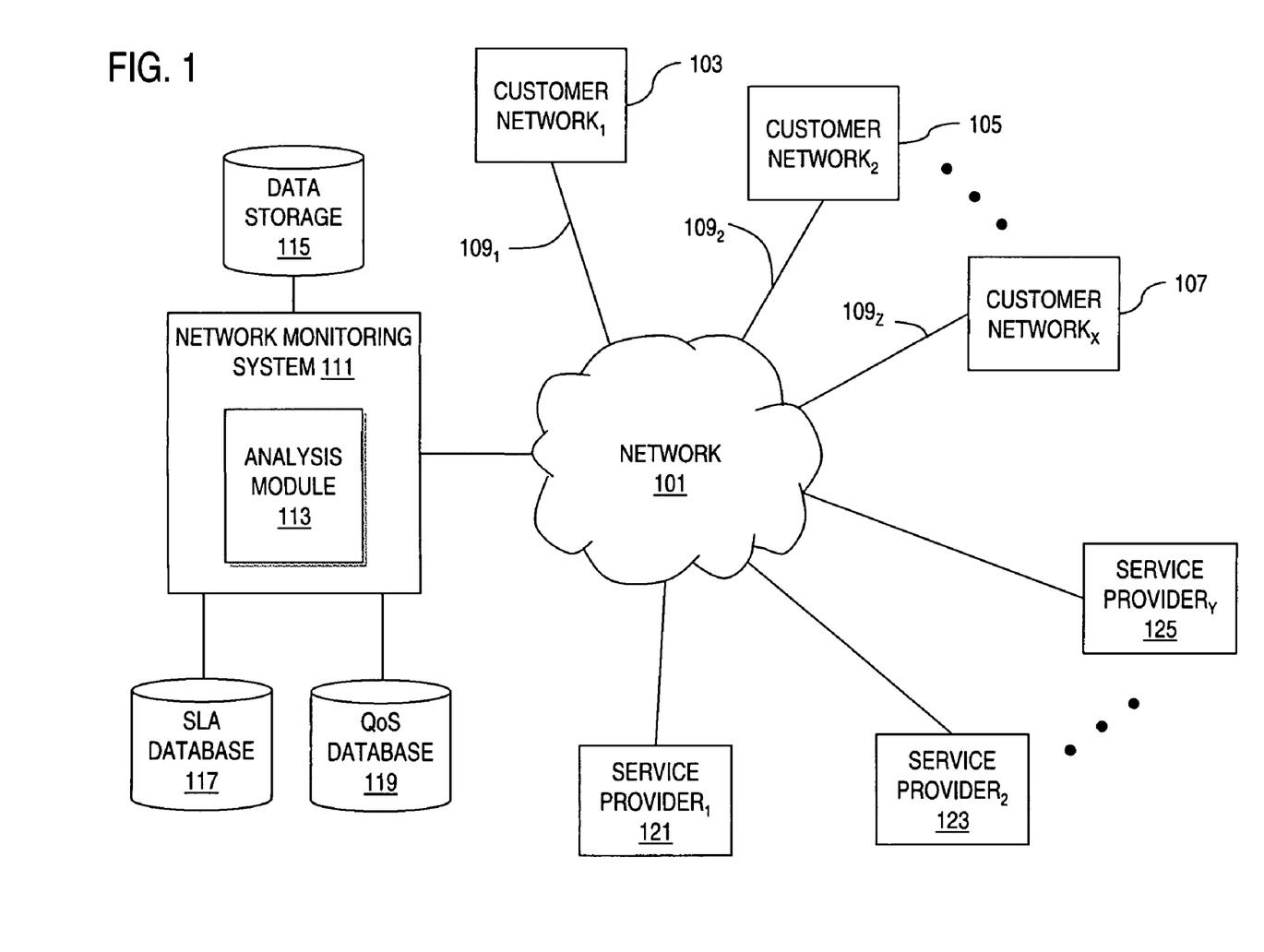
FIG. 1 is a system diagram of a network monitoring system connected to a multi-service network providing service to customers, according to an exemplary embodiment.

FIG. 1 is a diagram of a system capable of monitoring a network in order to collect data regarding usage of the network, detect problems associated with SLA requirements, QoS guarantees, and bandwidth management, and provide corrective actions for such problems. Such a system can be used to provide network operators with prompt and efficient rule-driven solutions to network link usage problems.

In FIG. 1, a network 101 is depicted, such as a multi-service network that can carry voice, video, and/or data traffic from one or more service providers to one or more customers. In FIG. 1, the network 101 serves service provider$_1$ 121, service provider$_2$ 123, . . . , and service provider$_Y$ 125, where Y is the total number of service providers, and it connected to customer network$_1$ 103, customer network$_2$ 105, . . . , and customer network$_X$ 107, where X is the total number of customer networks.

A network monitoring system 111 is connected to the network 101 in order to monitor the network, collect usage data, and analyze the usage data to detect problems associated with SLA requirements, QoS guarantees, and bandwidth management using an analysis module 113. The network monitoring system 111 can interface with or incorporate a data storage 115 that is used to store usage (traffic) data collected by the network monitoring system 111 from the network 101. The network monitoring system 111 can also interface with or incorporate an SLA database 117 and a QoS database 119, which can be used to assess whether the network 101 is satisfying SLA requirements and/or QoS guarantees, respectively.

The network monitoring system 111 can periodically audit the network 101 to collect data related to the network including the network links, such as links $109_1$, $109_2$, and $109_Z$, between the service providers and the customers. By way of example, the network 101 can include a networking device that provides connectivity between the one or more service providers and the one or more customers. For example, the networking device can be any type of customer premise equipment (CPE) for supporting the networking technology utilized by the network. For example, the networking device can be a switch that provides either frame relay, asynchronous transfer mode (ATM), fiber distributed data interface (FDDI), synchronous optical network (SONET), multi-protocol label switching (MPLS), etc.; or a device that provides access to a dedicated leased line, e.g., add-drop multiplexer, etc. Thus, the system 111 can audit the network 101 and collect data relating to usage of the network from the networking device (e.g., router, etc.). This data can then be processed by the network monitoring system 111 and stored in the data storage 115 for later analysis. Note that network links $109_1$, $109_2$, and $109_Z$ can be separate links or combined into one or more common links, depending upon the configuration of the network 101.

Figure 9:
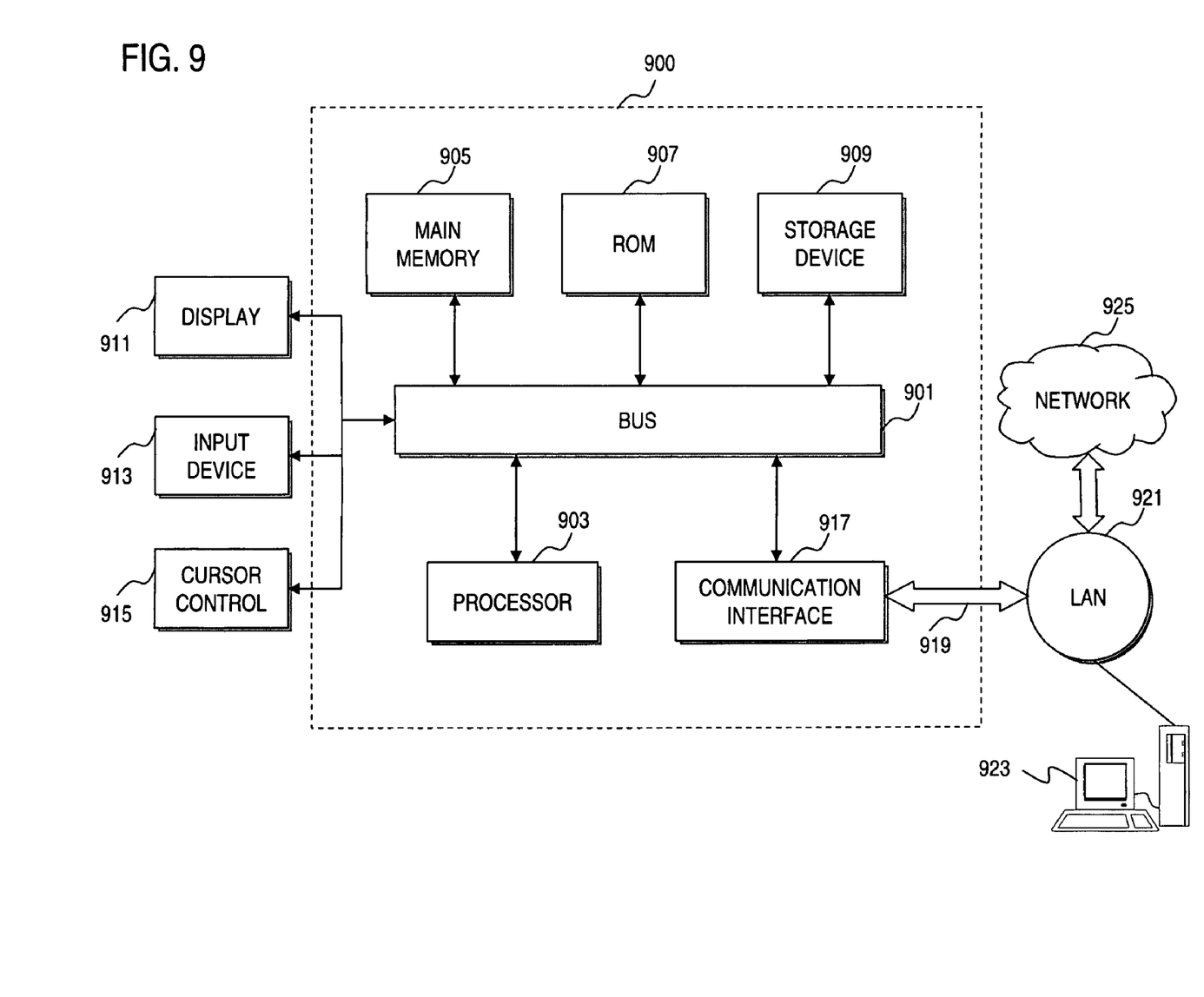
FIG. 9 is a diagram of a computer system that can be used to implement various exemplary embodiments.

The network device, such as a router, operates at the physical layer, link layer and network layer of the open systems interconnection (OSI) model to transport data across the network 101. For example, the router can behave as an edge router to a router-based system within a data network. In general, the router can determine the "best" paths or routes by utilizing various routing protocols. Routing tables are maintained by each router for mapping input ports to output ports using information from routing protocols. Exemplary routing protocols include border gateway protocol (BGP), interior gateway routing protocol (IGRP), routing information protocol (RIP), and open shortest path first (OSPF). In addition to intelligently forwarding data, the routers can provide various other functions, such as firewalling, encryption, etc. These router functions can be performed using a general purpose computer (e.g., as shown in FIG. 9), or a highly specialized hardware platform with greater processing capability to process high volumes of data and hardware redundancies to ensure high reliability.

Thus, traffic data can be collected by the system 111 at intervals, for example, by an element management system (EMS) or by a network sniffer. The auditing of the network 101 by the network monitoring system 111 can be performed according to a schedule (e.g., periodically) or on-demand to acquire sufficient data points to provide an accurate analysis of the usage of the network 101. Typically, both ingress and egress traffic flowing through an NE port are collected by the network monitoring system 111 and stored in data storage 115, and such data represents the in/out traffic on the network link connected to that port. Assuming the networking device used by the network 101 is a router, the router can be configured to provide flow statements, such as Cisco NetFlow™ statements, for assisting with accurate data acquisition regarding traffic/bandwidth usage. Accordingly, the router can be periodically audited to ensure that configuration NetFlow™ statements supported so that flow information can be exported to the system 111.

A database of traffic for each network link can be collected and organized by customer, service provider, etc. and stored in the data storage 115 for further analysis by the analysis module 113. Using the storage database 115, as well as the SLA database 117 and the QoS database 119, the analysis module 113 can determine problems associated with SLA requirements, QoS guarantees, and bandwidth management, as will be discussed in greater detail below.

It should be noted that the system 111 can be used to monitor and analyze multiple networks 101. The data collection and analysis can be performed concurrently, wherein the data is stored and analyzed by the system for each particular network, or for each service provider and/or customer utilizing each particular network.

Network operators have to ensure that the network meets customer SLA requirements and QoS guarantees, and have to apportion network bandwidth for the different services riding over a common network infrastructure. In many cases the customers are also allocated specific bandwidth based on their needs. Thus, network operators have the complex task of correctly sizing the common NEs and the links inter-connecting them to meet all the customer and service requirements.

In order to ensure QoS guarantees and thus meet SLA requirements, service provider networks, such as multi-service IP networks, must be sized to meet traffic requirements. IP networks must be able to adapt to changing trends in peak traffic requirements in order to efficiently utilize resources of the network, and ensure QoS and satisfy SLA requirements. Physical changes to the network, such as upgrading of network link hardware, the addition of new network links, etc., that are needed to respond to changes in peak traffic requirements of the network require planning and time to implement. Thus, prompt and efficient detection and correction of problems is a critical task for network operators. Network elements (NEs) and connecting fibers/cables/links take time to add or upgrade, and therefore prompt detection and efficient correction of problems is needed.

When a particular requirement is not met or usage crosses a set threshold, it signifies a failure and corrective action(s) needs to be taken. Depending upon the detected problem and the network resources available, there could be multiple choices of corrective actions, some of which could be simple, while others could be more involved, for example, by requiring extensive changes to the current network configuration. As such a multi-service network is typically a shared resource network, network operators have to ensure that the proposed corrective action also does not adversely affect other customers/services. In some cases when the network is operating near full capacity, additional resource build-up may be the only option. At the other extreme are situations where an abnormality is noted, but the corrective action chosen is that no action is needed.

There are many input parameters to be considered when determining whether a problem exists, such as the customers and their needs, different types of services being provided and the QoS needs of the services being provided, specific bandwidth requirements for the services and the customers, etc.

Also, the number of modes of failure can be large. Finally, there can be multiple corrective actions possible for the different modes of failure, and even multiple corrective actions possible for the same mode of failure. To solve the myriad of network requirements, possible failures, and possible solutions, the embodiment of the present invention discussed below provides a simple and logical, yet holistic and powerful, rule-based mechanism for possible choices of ordered corrective actions. The method is to combine data from various sources for a holistic analysis and thus reason into simple corrective actions.

Figure 2:
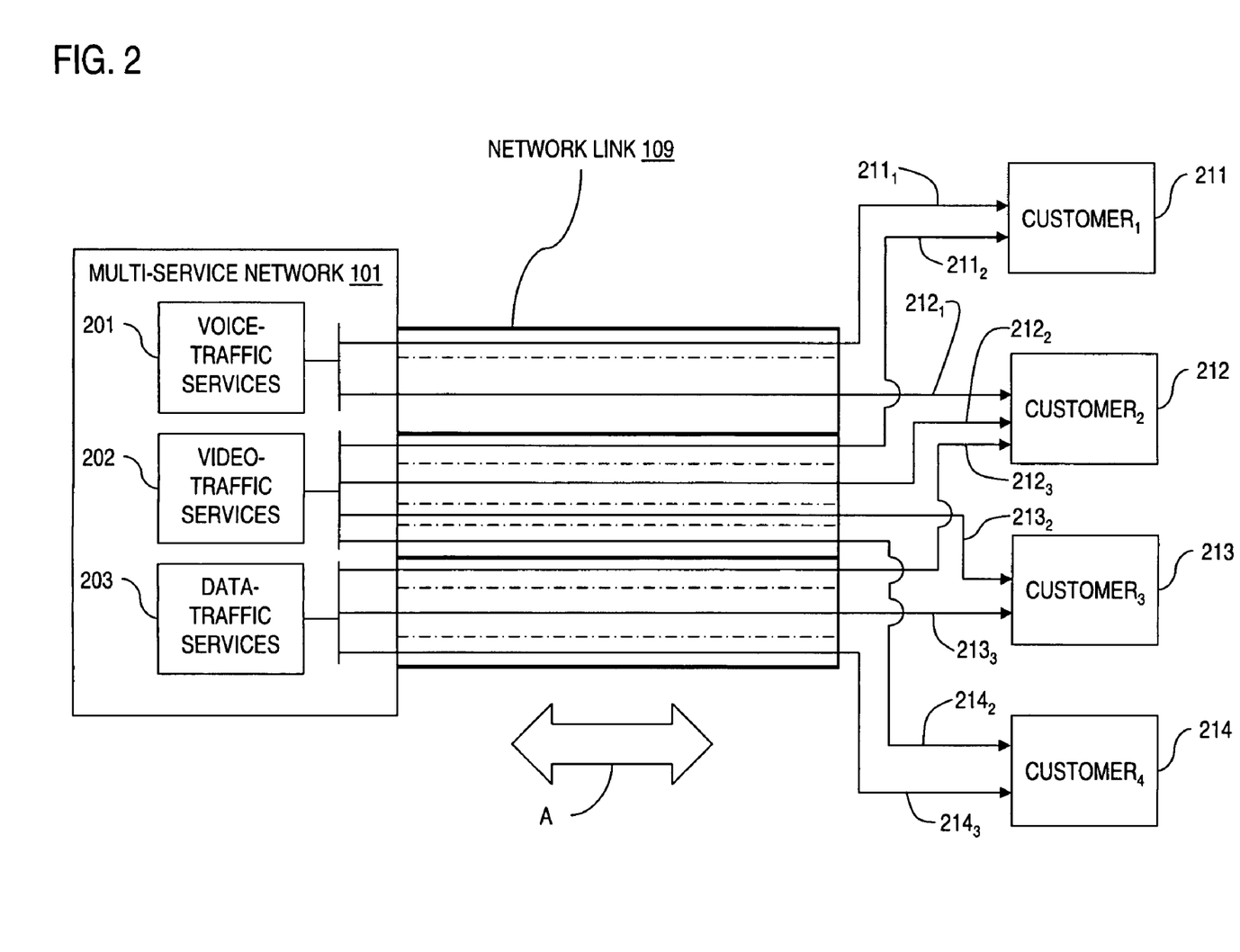
FIG. 2 is a schematic diagram of a network link connecting a multi-service network with plural customers, according to an exemplary embodiment.
Figure 3:
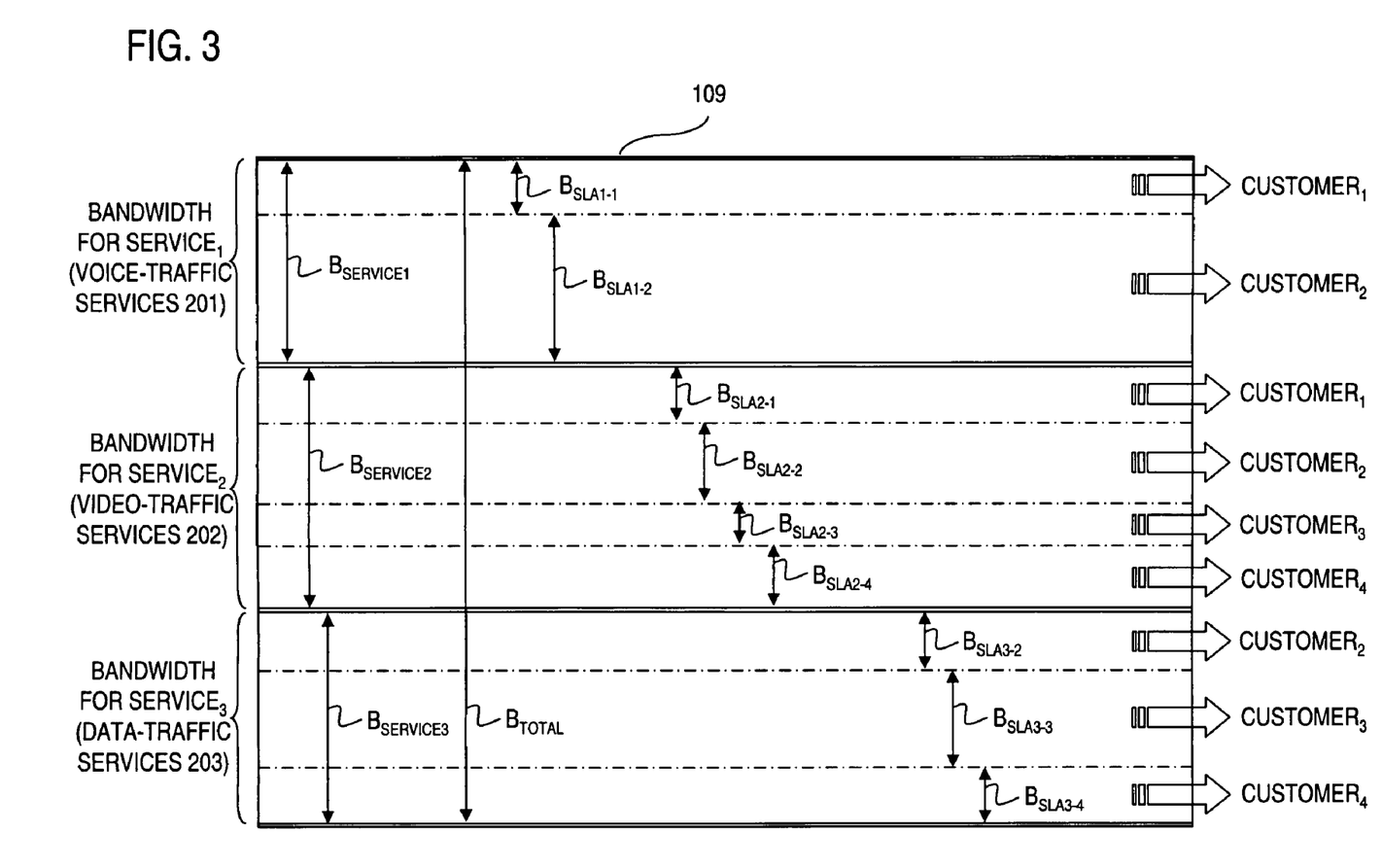
FIG. 3 is a schematic diagram of the network link showing representations of the bandwidth provided by the network link for various services to the customers, according to an exemplary embodiment.

Thus, network operators (service providers) must meet at least two broad classifications of requirements, which include service level requirements (i.e., QoSs) and customer level requirements (i.e., SLAs). FIGS. 2 and 3 will be used to describe the allocation of bandwidth of a network link 109 amongst various traffic services (service$_1$ or voice-traffic services 201, service$_2$ or video-traffic services 202, and service$_3$ or data-traffic services 203) and to various customers (customer$_1$ 211, customer$_2$ 212, customer$_3$ 213, and customer$_4$ 214) in an exemplary embodiment. FIG. 2 is a schematic diagram of a network link connecting a multi-service network with plural customers, and FIG. 3 is a schematic diagram of the network link showing representations of the bandwidth provided by the network link for various services to the customers. It should be noted that the various traffic services depicted in FIGS. 2 and 3 are conduits providing content or applications to the customers from one or more of the service providers 121, 123, 125 via the network 101. Also, it should be noted that the network link 109 can be one or a combination of plural links between the network and customers. The traffic can flow in both directions along the network link 109, as shown using arrow A.

Each service has its own specific QoS needs. For example, some of the more important QoS parameters include delay, jitter, packet loss, network throughput, etc., of each service. QoS can be guaranteed by, for example, apportioning service bandwidth for each service (e.g., by providing a call admission control (CAC) bandwidth for each service), and setting appropriate priority for each service (i.e., preference for routing of one service over other services).

Regarding the allocation of service bandwidth for QoS guarantees, a network link can be configured to carry one or more services, and therefore each service should be provided with an appropriate service bandwidth (e.g., CAC bandwidth). In addition, as will be described below in greater detail, an appropriate SLA bandwidth (which can be allocated amongst one or more service bandwidths for services to which the customer subscribes) will be allocated for each customer to meet SLA requirements of that customer.

Service bandwidth for each service is based on factors such as, total bandwidth of the network link, a type of service being provided, a number of customers utilizing the service and the SLA bandwidths of those customers, and a growth forecast of the traffic on the network link.

If $B_{TOTAL}$ is the total bandwidth of a network link and $B_{SERVICE}$ is a service bandwidth, then:

$B_{TOTAL} \geq B_{SERVICE1} + B_{SERVICE2} + \ldots + B_{SERVICEm}$, where m is the total number of services on the network link.

Thus, in the exemplary embodiment depicted in FIG. 3, $B_{TOTAL}$ should be greater than or equal to $B_{SERVICE1} + B_{SERVICE2} + B_{SERVICE3}$. In the example in FIG. 3, $B_{SERVICE1}$ is allocated to provide for $B_{SLA1-1}$ (for customer$_1$) and $B_{SLA1-2}$ (for customer$_2$); $B_{SERVICE2}$ is allocated to provide for $B_{SLA2-1}$, $B_{SLA2-2}$, $B_{SLA2-3}$ (for customer$_3$), and $B_{SLA2-4}$ (for customer$_4$); and $B_{SERVICE3}$ is allocated to provide for $B_{SLA3-2}$, $B_{SLA3-3}$, and $B_{SLA3-4}$. Thus, the apportioned SLA bandwidths for each customer are accounted for in the respective service bandwidths (e.g., $B_{SERVICE1}$, $B_{SERVICE2}$, and/or $B_{SERVICE3}$) for services to which the customer subscribes.

In addition to the apportioning of service bandwidths to ensure QoS guarantees, service priority settings for each service can be used. An example of service priority settings that can be used to provide QoS guarantees can include defining service priority values (P) to each of the three services (i.e., $service_1$, $service_2$, and $service_3$, in descending order) as follows:

$P_{SERVICE1}$=6 to 10;
$P_{SERVICE2}$=4 to 8; and
$P_{SERVICE3}$=2 to 5.

In this case, a network operator can select a priority value within the given range for that service in order to prioritize routing of the various services based on their QoS needs.

SLAs generally include a measurable set of parameters that a customer is allotted/guaranteed. For example, SLAs can include a number of voice lines, a particular voice bandwidth, a number of video sessions (e.g., HDTV, VOD, etc., or a combination of varying types of video sessions), a particular video bandwidth, a particular data bandwidth, and/or a customer category (e.g., a ranking based on a guarantee of the availability of the other SLAs, for example, where a "Gold" category that is defined as the highest ranking (i.e., given preference over the other category rankings) and given a ranking value of "3", a "Silver" category that is defined as the middle ranking and given a ranking value of "2", and "Bronze" category that is defined as the lowest ranking and given a ranking value of "1").

SLA requirements are generally met by allocating appropriate SLA bandwidths for customers. For example, a customer can be allotted a certain SLA bandwidth ($B_{SLA}$), and the SLA bandwidth can then be apportioned into bandwidths for the different services that the customer has subscribed to, where the actual values depend on the requirements of the services. For example, in general:

$B_{SLA}=B_{SLA1}+B_{SLA2}+\ldots+B_{SLAn}$ where n is the total number of services subscribed to by the customer.

Thus, as is depicted in FIG. 2, customer, 211 receives both $service_1$ (or voice-traffic services 201) via connection 211$_1$, and $service_2$ (or video-traffic services 202) via connection 211$_2$. And, as representatively depicted in FIG. 3, customer, 211 has been allocated an SLA bandwidth that is equal to $B_{SLA1-1}$ (for $service_1$)+$B_{SLA2-1}$ (for $service_2$). Additionally, $customer_2$ 212 receives $service_1$ via connection 212$_1$, $service_2$ via connection 212$_2$, and $service_3$ (or data-traffic services 203) via connection 212$_3$; $customer_3$ 213 receives $service_2$ via connection 213$_2$ and $service_3$ via connection 213$_3$; and $customer_4$ 214 receives $service_2$ via connection 214$_2$ and $service_3$ via connection 214$_3$. Furthermore, $customer_2$ 212 has been allocated an SLA bandwidth that is equal to $B_{SLA1-2}$ (for $service_1$)+$B_{SLA2-2}$ (for $service_2$)+$B_{SLA3-2}$ (for $service_3$); $customer_3$ 213 has been allocated an SLA bandwidth that is equal to $B_{SLA2-3}$ (for $service_2$)+$B_{SLA3-3}$ (for $service_3$); and $customer_4$ 214 has been allocated an SLA bandwidth that is equal to $B_{SLA2-4}$ (for $service_2$)+$B_{SLA3-4}$ (for $service_3$).

While allocating customer SLA bandwidth, the fact that not all the customers would use their services at the same time or to the full extent of their SLA can be factored in the allocation, and therefore that network bandwidth resources will not be utilized by all customers at the same time or to the full extent. Thus, it is possible to make provisions for more customers than otherwise would be the case under a full usage scenario on the service bandwidth (e.g., CAC bandwidth). Such a provision can be characterized as an "over-subscription factor," and can be made dependent on an SLA customer category (e.g., the higher the customer's category value is, the lower the over-subscription factor assigned to the customer). Historical data regarding the percentage of usage of the network bandwidth resources can be used to determine a set of actual values used for the over-subscription factors that are assigned to the different SLA customer categories.

Thus, if $O_{SERVICE1}$ is the over-subscription factor for $service_1$ and $C_1$ is the number of customers on the $service_1$ CAC bandwidth ($B_{SERVICE1}$) and $B_{SLA1-1}$, $B_{SLA1-2}$ ... $B_{SLA1-C1}$ are the customer SLA bandwidths for the $C_1$ customers, then $B_{SLA1-1}+B_{SLA1-2}+\ldots+B_{SLA1-C1}=B_{SERVICE1}*O_{SERVICE1}$.

Similarly, if $O_{SERVICE2}$ is the over-subscription factor for $service_2$ and $C_2$ is the number of customers on the $service_2$ CAC bandwidth ($B_{SERVICE2}$), then $B_{SLA2-1}+B_{SLA2-2}+\ldots+B_{SLA2-C2}=B_{SERVICE2}*O_{SERVICE2}$.

And, if $O_{SERVICE3}$ is the over-subscription factor for $service_3$ and $C_3$ is the number of customers on the $service_3$ CAC bandwidth ($B_{SERVICE3}$), then $B_{SLA3-1}+B_{SLA3-2}+\ldots+B_{SLA3-C3}=B_{SERVICE3}*O_{SERVICE3}$.

Figure 4:
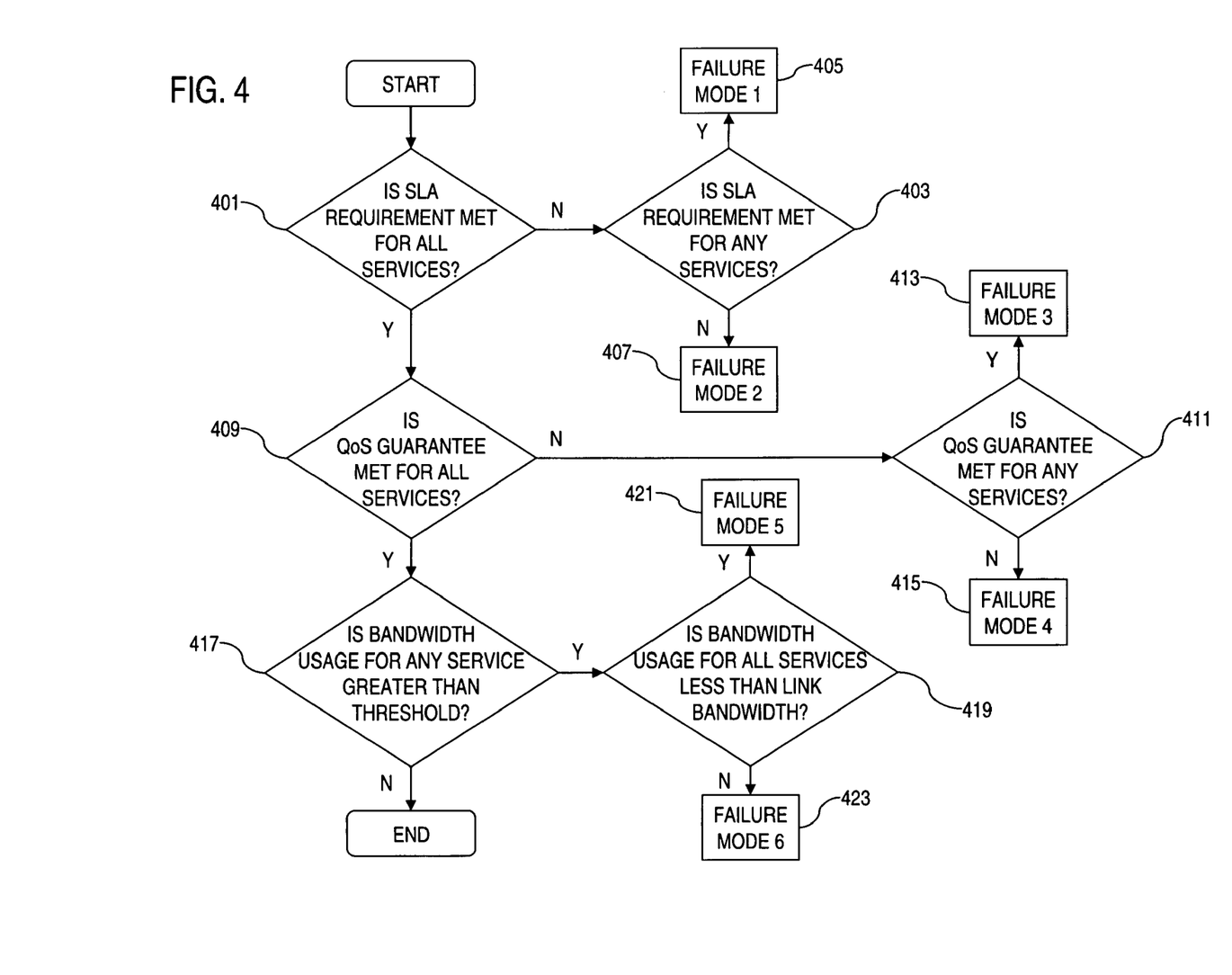
FIG. 4 is a flowchart of a process for monitoring status of the network link and determining failure mode(s) of the network link, according to an exemplary embodiment.
Figure 5:
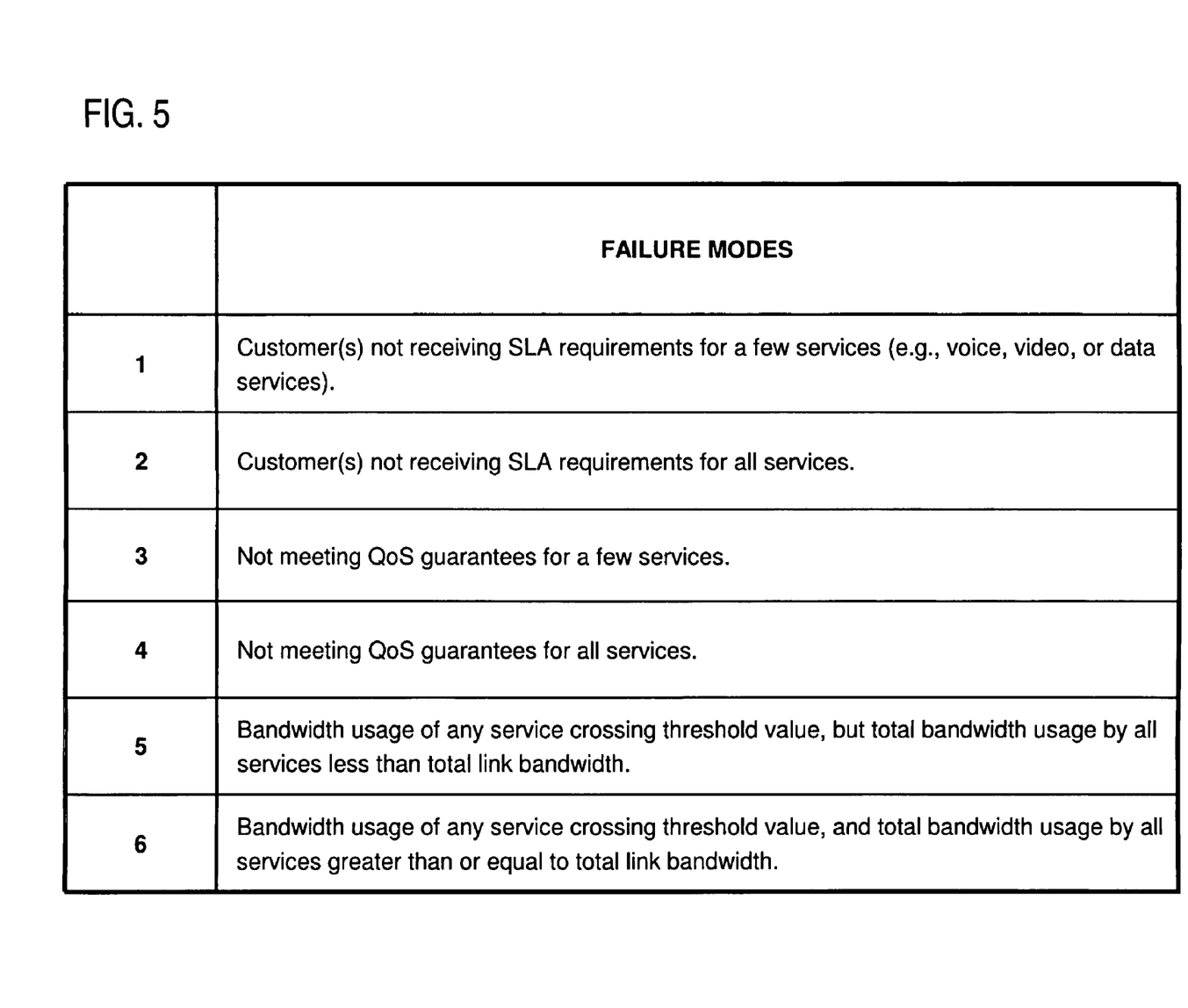
FIG. 5 is a table showing six failure modes of the network link, according to an exemplary embodiment.

FIG. 4 is a flowchart of a process for monitoring status of the network link and determining failure mode(s) of the network link, and FIG. 5 is a table showing six failure modes of the network link, according to an exemplary embodiment. In the exemplary embodiment, the analysis module 113 will perform the process set forth in FIG. 4 to determine if one of the failure modes set forth in FIG. 5 has occurred. As set forth in FIG. 5, in the exemplary embodiment, six failure modes have been defined. However, it should be noted that more or less failure modes can alternatively be used, and/or different failure modes can be defined. The analysis module 113 will preferably perform the process set forth in FIG. 5 at regular intervals, with a greater frequency of the intervals providing more prompt detection of failure modes.

As listed in FIG. 5, the first failure mode occurs when a customer (or a plurality of customers) is (are) not receiving SLA requirements for one or more (but not all) services (e.g., voice, video, or data services) to which they subscribe. The second failure mode occurs when a customer (or a plurality of customers) is (are) not receiving SLA requirements for all services to which they subscribe. The third failure mode occurs when the network link is not meeting QoS requirements for one or more (but not all) services utilizing the network link. The fourth failure mode occurs when the network link is not meeting QoS requirements for all of the services utilizing the link. The fifth failure mode occurs when bandwidth usage of any service crosses a threshold value, but total bandwidth usage by all services on the network link is less than the total link bandwidth. And, the sixth failure mode occurs when bandwidth usage of any service crosses a threshold value, and the total bandwidth usage by all services on the network link is greater than or equal to total link bandwidth.

Thus, in the exemplary embodiment, the analysis module 113 performs the process set forth in FIG. 4 to determine if one of the failure modes set forth in FIG. 5 has occurred. In step 401, the analysis module 113 accesses the traffic data in data storage 115 and the SLAs in SLA database 117 to determine whether the SLA requirements for the customer(s) are being met for all services. If the determination in step 401 is yes, then the process proceeds to step 409, but if the determination in step 401 is no, then the process proceeds to step 403. In step 403, the analysis module determines whether the SLA requirements for the customer(s) are being met for any of the services. If the determination in step 403 is yes, then the process proceeds to 405, which indicates that a first failure mode has occurred, but if the determination in step 403 is no, then the process proceeds to 407, which indicates that a second failure mode has occurred.

In step 409, the analysis module 113 accesses the traffic data in data storage 115 and the QoS guarantees in QoS database 119 to determine whether the QoS guarantees are being met for all services. If the determination in step 409 is yes, then the process proceeds to step 417, but if the determination in step 409 is no, then the process proceeds to step 411. In step 411, the analysis module determines whether the QoS guarantees are being met for any of the services. If the determination in step 411 is yes, then the process proceeds to 413, which indicates that a third failure mode has occurred, but if the determination in step 411 is no, then the process proceeds to 415, which indicates that a fourth failure mode has occurred.

In step 417, the analysis module 113 accesses the traffic data in data storage 115 to determine whether bandwidth usage of any service crosses a threshold value. The threshold value can be a value equal to or less than the service bandwidth (e.g. a CAC bandwidth) allocated to that service. If the determination in step 417 is no, then the process ends. However, if the determination in step 417 is yes, then the process proceeds to step 419 where the analysis module 113 determines whether the bandwidth usage for all of the services is less than the total network link bandwidth. If the determination in step 419 is yes, then the process proceeds to 421, which indicates that a fifth failure mode has occurred, but if the determination in step 419 is no, then the process proceeds to 423, which indicates that a sixth failure mode has occurred.

Figure 6:
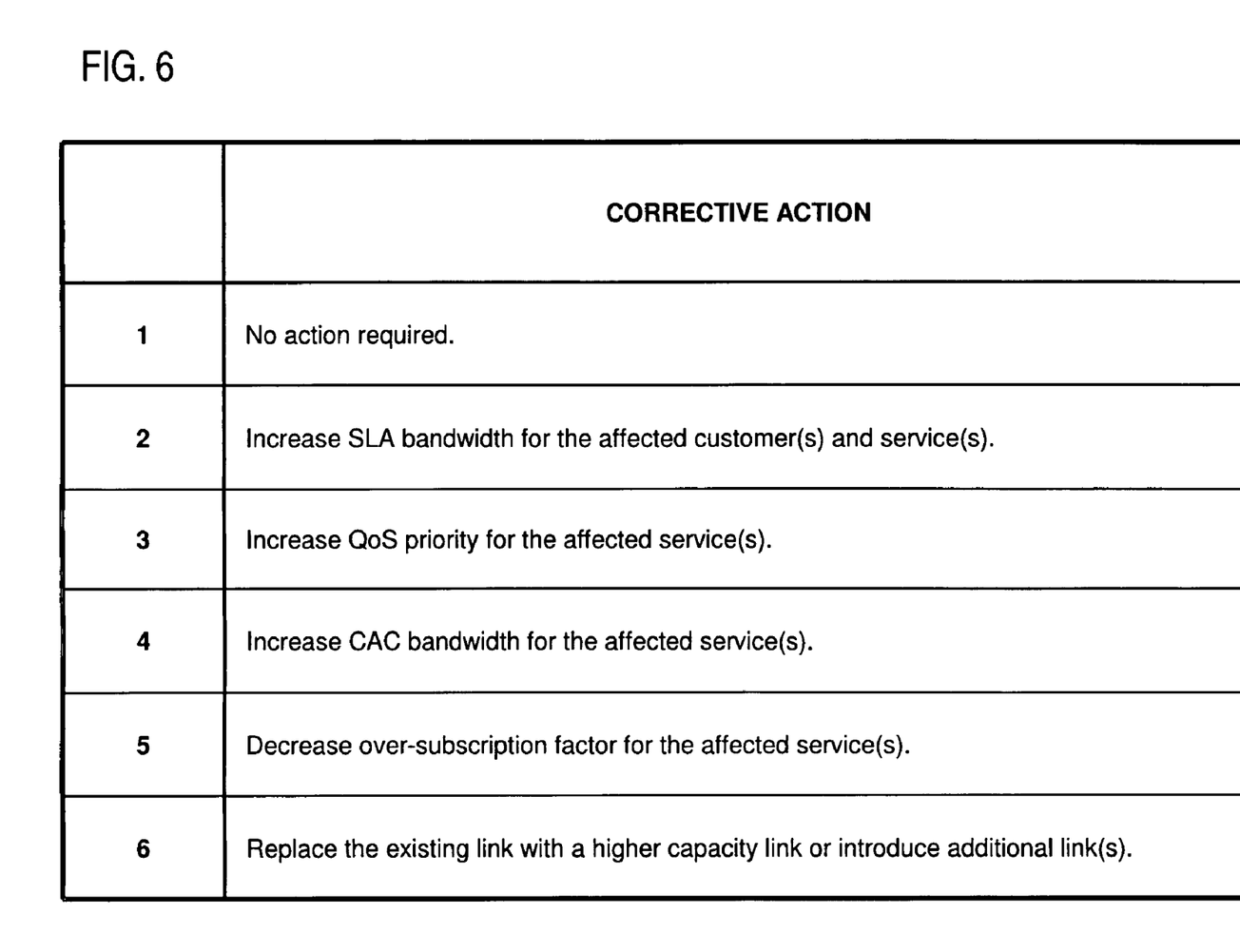
FIG. 6 is a table showing six corrective actions for use in response to failure modes, according to an exemplary embodiment.

FIG. 6 sets forth a table showing six corrective actions for use in response to the failure modes, according to an exemplary embodiment. It should be noted that more or less corrective actions can alternatively be used, and/or corrective actions can be defined. Based on the results found using the process in FIG. 4, the analysis module 113 can then determine which corrective action should be taken using the procedural rules defined in the table in FIG. 7, according to an exemplary embodiment. The analysis module 113 can determine the corrective action to be taken using the process of monitoring and resolving failure modes of the network link set forth in FIG. 8, according to an exemplary embodiment. The analysis module 113 will preferably perform the process set forth in FIG. 8 promptly following the detection of a failure mode, and thus promptly provide the network operators with a rule-based corrective action to be taken.

As listed in FIG. 6, the first corrective action that is defined actually indicates that no action is required, thus advising the network operators of an issue but not requiring action at the present time. This corrective action is used in cases where the effect of the failures is marginal, and where the failures may occur rarely and do not affect higher SLA category customers.

The second corrective action includes increasing the SLA bandwidth for the affected customer(s) and service(s). This corrective action can be carried out where, for example, services 1 and 3 are affected for customers 4 and 6, respectively, by then increasing $B_{SLA1-4}$ and $B_{SLA3-6}$. Note, however, if a customer (having three services) were allotted a fixed total bandwidth, this would also call for decreasing $B_{SLA2-4}$ and/or $B_{SLA3-4}$ for customer 4 and $B_{SLA1-6}$ and/or $B_{SLA2-6}$ for customer 6. Care should be taken to ensure these services are not affected for the above two exemplary customers.

The third corrective action is defined as increasing QoS priority for the affected service(s). This corrective action can be carried out where, for example, service 3 is affected, by then increasing $P_{SERVICE3}$. Alternatively, the same result can be reached by decreasing the QoS priorities of one or more of other services, thereby relatively increasing the QoS priority of the affected service(s).

The fourth corrective action includes increasing the service bandwidth (e.g. CAC bandwidth) for the affected service(s). This corrective action can be carried out where, for example, service 2 is affected, by then increasing $B_{SERVICE2}$. Note that this action may necessitate decreasing the service bandwidth for other services. Care should be taken to ensure these services are not affected.

The fifth corrective action is defined as decreasing the over-subscription factor for the affected service(s). This corrective action can be carried out where, for example, service 1 is affected, by then decreasing $O_{SERVICE1}$. Note that this action implies reducing the number of customers on a link and so some customers may or will need to be moved to other links.

And, the sixth corrective action includes replacing the existing link with a higher capacity link or introduce additional link(s). This corrective action can be carried by the network operators by, for example, using current usage data and an estimation of future usage.

Figure 7:
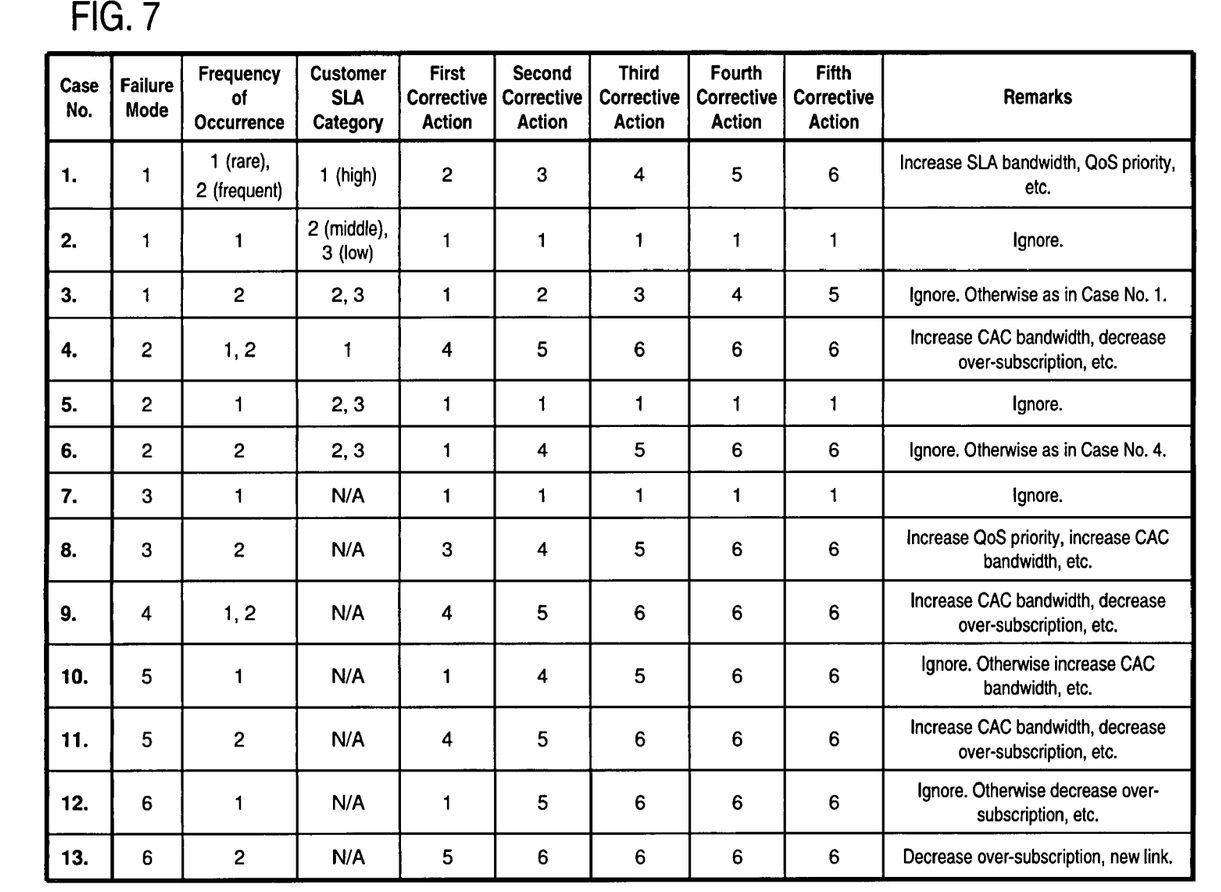
FIG. 7 is a table setting forth a procedure for taking corrective actions in response to various failure modes and other criteria, according to an exemplary embodiment.

The rules defined in the table in FIG. 7 for taking corrective action are determined based on the failure mode detected, the frequency of occurrence of the detected failure mode (rarely occur, frequently occur, etc., which can be defined by the network operators as needed), and, in some instances, the customer SLA category. In the exemplary embodiment shown in FIG. 7, five successive corrective actions are set forth for fourteen different cases, and these successive corrective actions can be implemented successively until the failure mode is resolved. In some cases the successive corrective actions remain the same, in other cases the successive corrective actions change or increase (e.g., from the first corrective action in the first instance of the failure mode detection, to the second corrective action in the second instance of the failure mode detection, etc.), and in some cases the successive corrective actions plateau.

Figure 8:
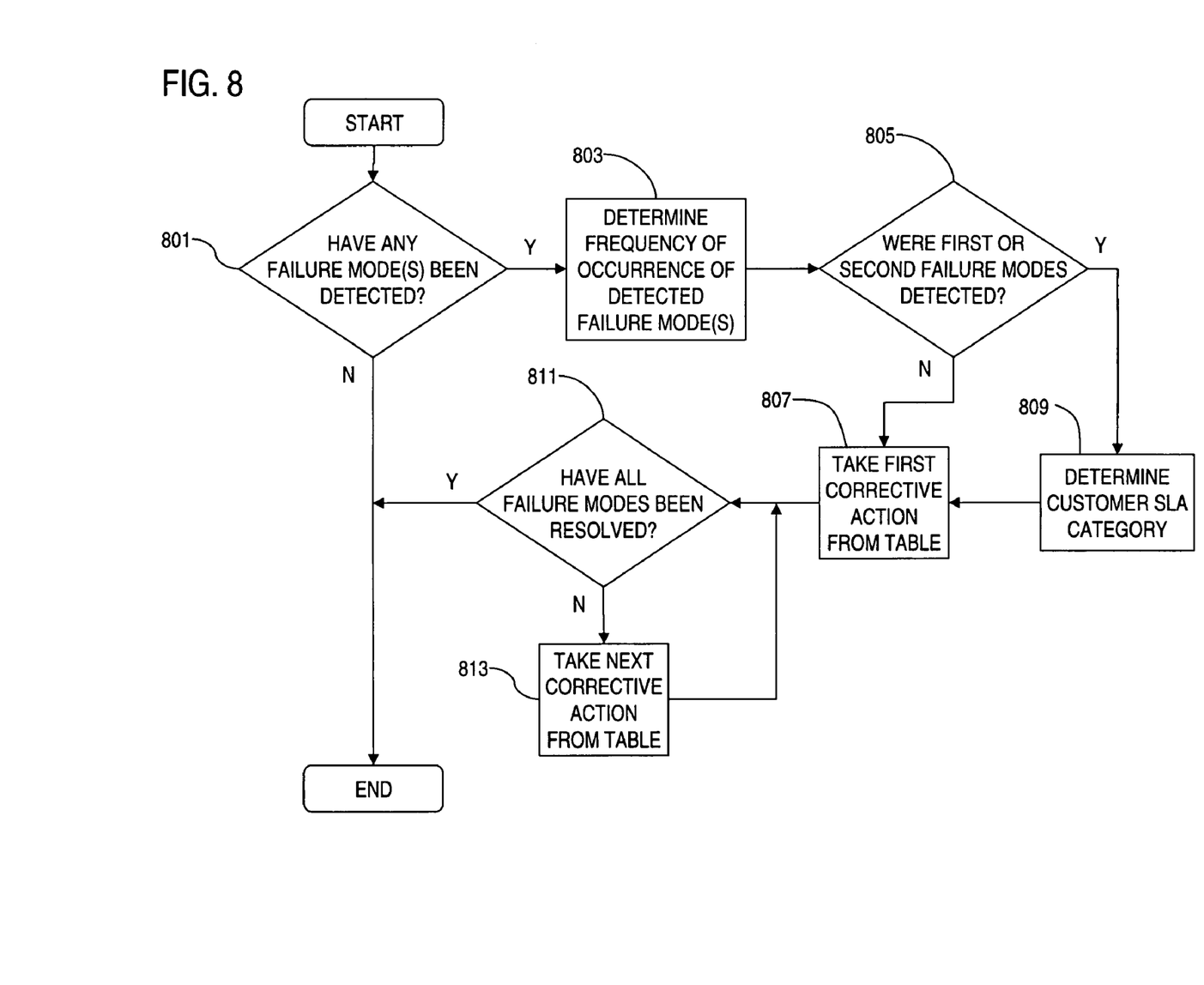
FIG. 8 is a flowchart of a process of monitoring and resolving failure modes of the network link, according to an exemplary embodiment.

FIG. 8 sets forth the process conducted by the analysis module 113 to determine the corrective action to be taken during the process of monitoring and resolving failure modes of the network link, according to an exemplary embodiment. In step 801, the analysis module 113 determines whether any failure modes have been detected, for example, by using the process set forth in FIG. 4. If the determination in step 801 is no, then the process ends. However, if the determination in step 801 is yes, then the process proceeds to step 803, where a determination is made regarding the frequency of occurrence of detected failure modes. Then the process proceeds to step 805 where it is determined whether the failure modes detected are first or second failure modes. If the determination in step 805 is no, then the process proceeds to step 807 where the first corrective action is taken from the table in FIG. 7 using the data found in steps 801 and 803. In other words, the data found in steps 801 and 803 can be used to determine which "Case No." in FIG. 7 is appropriate for use in the present instance. If the determination in step 805 is yes, then the process proceeds to step 809 where the customer SLA category is determined, for example, from the SLA database 117. Once the customer SLA category is found, then the process proceeds to step 809 where the first corrective action is taken from the table in FIG. 7 using the data found in steps 801, 803, and 807. In other words, the data found in steps 801, 803, and 807 can be used to determine which "Case No." in FIG. 7 is appropriate for use in the present instance. Then, in step 811, it is determined whether all of the failure modes have been resolved by the corrective action. If the determination in step 811 is yes, then the process ends. However, if the determination in step 811 is no, then the process proceeds to step 813 where the next successive corrective action is taken from the table in FIG. 7 and a determination is again made in step 811 regarding whether all of the failure modes have been resolved.

The corrective actions taken in FIG. 7 are in increasing order of complexity, network disturbance and cost. Hence the first choice would be the appropriate lowest numbered corrective action.

Case Nos. 1, 2, and 3 in FIG. 7 represent customers not getting SLA for some services. It is prudent to ignore (i.e., take no action) such situations in the case of lower SLA category customers when such failure modes occur infrequently. However, some corrective action can be taken when such situations occur frequently for them. For higher SLA category customers, corrective action can be required at all times. The easiest way to take corrective action in such situations is to increase customer SLA bandwidth for the affected service, rather than to increase QoS priority for the services. The latter would affect all the customers in the service (CAC) bandwidth.

Case Nos. 4, 5, and 6 in FIG. 7 represent situations where customers are not getting SLA for all the services. This is similar to the above situation, but it is not practical to increase SLA bandwidth for all the services as the customer's total allotted bandwidth would then be exceeded. So changes to SLA are not an option here. Also, an increase in service QoS priority would not help either in this situation, as it would include an increase in QoS priority for all the services and the net effect would be null. The right solution is to increase the service (CAC) bandwidth for all the services. This would, of course, imply that the link has enough additional bandwidth. If the link does not have enough additional bandwidth, then other solutions could be to reduce the number of customers on a service bandwidth by decreasing the over-subscription factor, or to introduce new links.

Case Nos. 7 and 8 in FIG. 7 represent situations in which QoS guarantees are not met for a few services. Such situations can be ignored when their occurrence is infrequent. Otherwise, corrective action should be taken starting with an increase in QoS priority for these services. More pronounced corrective actions would be to increase corresponding service bandwidth etc.

When QoS guarantees are not met for all the services, as in Case No. 9 in FIG. 7, then the only options are to increase the service bandwidth for all the services (if it is possible), move customers to other links by reducing the over-subscription factor, or by introducing larger/new link(s).

Case Nos. 10 and 11 in FIG. 7 are those where some service bandwidths are crossing the set thresholds but there is still room for increasing the service bandwidth limit in the link.

Case Nos. 12 and 13 in FIG. 7 are similar to the above, but the link is full. The options in these cases are now to move customers by reducing the over-subscription factor, or to introduce larger/new links.

Thus, the process described above provides rule-based corrective actions that are applied whenever a failure is detected in a running network. This process is holistic and iterative and relies on traffic and performance data collected from the network, real-time or near real-time.

By using historical data and intelligent trending of the traffic growth, we can forecast failures (in SLA requirements, QoS guarantees, and bandwidth) in the future period. The process described above is equally applicable to a scenario of capacity planning for the future.

Thus, the system and process set forth herein solves the problem of myriad network requirements, failures and solutions, by using a rule-based mechanism for possible choices of ordered corrective actions, thus effectively managing SLA, QoS and bandwidth in a multi-service network. The system and process is simple but holistic and logical, and is adaptable to different needs and policies of network operators.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 9 illustrates computing hardware (e.g., computer system) 900 upon which an embodiment according to the invention can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g.

for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements.

The invention claimed is:

1. A method comprising:
monitoring traffic over a network link that provides one or more services to one or more customers;
determining whether a failure mode of the network link has occurred by comparing the monitored traffic to predetermined bandwidth criteria; and
selecting a corrective action to be taken in response to the failure mode,
wherein the comparison of the monitored traffic to the predetermined bandwidth criteria is performed on a service-by-service basis, wherein the monitored traffic for each of the one or more services is compared to predetermined bandwidth criteria associated with the service,
wherein types of the failure mode are determined based on a proportion of the one or more services with respect to which the monitored traffic fails to satisfy the associated predetermined bandwidth criteria, wherein the failure mode types comprise a one failure mode determined when at least one service and fewer than all services provided to at least one of the customers fail to satisfy associated service requirements, and another failure mode determined when all services provided to at least one of the customers fails to satisfy associated service requirements,
wherein selection of the corrective action to be taken is determined based on the failure mode type, and
wherein the selection of the corrective action to be taken is further determined based on a frequency of occurrence of the failure mode.

2. The method according to claim 1, wherein the selection of the corrective action to be taken is further determined based on a customer service level agreement category assigned to a customer associated with the failure mode.

3. The method according to claim 1, wherein the predetermined bandwidth criteria comprises one or more of service level agreement requirements associated with the one or more services, quality of service guarantees associated with the one or more services, and bandwidth threshold values associated with the one or more services.

4. The method according to claim 3, wherein the quality of service guarantees include a service priority setting for each of the one or more services, and/or allocated bandwidth for each of the one or more services.

5. The method according to claim 4, wherein the service priority setting is a value or a range of values for each of the one or more services.

6. The method according to claim 3, wherein the service level agreement requirements include a number of allocated voice traffic lines, allocated voice traffic bandwidth, a number of allocated video traffic sessions, allocated video traffic bandwidth, allocated data traffic bandwidth, and/or a customer service level agreement category.

7. The method according to claim 1, wherein the one or more services includes voice traffic services, video traffic services, and/or data traffic services.

8. The method according to claim 1, wherein the failure mode types further comprise one or more of:
a first failure mode type determined when at least one customer of the one or more customers is not receiving a service level agreement requirement for at least one service of the one or more services, but not for all services of the one or more services;
a second failure mode type determined when at least one customer of the one or more customers is not receiving a service level agreement requirement for all services of the one or more services;
a third failure mode type determined when a quality of service guarantee is not met for at least one service of the one or more services, but not for all services of the one or more services;
a fourth failure mode type determined when a quality of service guarantee is not met for all services of the one or more services;
a fifth failure mode type determined when a bandwidth usage for at least one service of the one or more services exceeds a threshold bandwidth for the at least one service, but a total bandwidth usage by all services of the one or more services is less than a total bandwidth of the network link; and
a sixth failure mode type determined when a bandwidth usage for at least one service of the one or more services exceeds a threshold bandwidth for the at least one service, and a total bandwidth usage by all services of the one or more services is greater than or equal to a total bandwidth of the network link.

9. The method according to claim 1, wherein the corrective action comprises one or more of:
a first corrective action including determining that no action is required in response to the failure mode;
a second corrective action including increasing service level agreement bandwidth for a customer associated with the failure mode;
a third corrective action including increasing a quality of service priority setting for a service associated with the failure mode;
a fourth corrective action including increasing allocated bandwidth for a service associated with the failure mode;
a fifth corrective action including decreasing an over-subscription factor assigned to a service associated with the failure mode; and
a sixth corrective action including replacing the network link with a higher capacity network link, and/or introducing one or more additional network links.

10. The method according to claim 9, wherein decreasing of the over-subscription factor assigned to the service associated with the failure mode includes reducing a number of customers using bandwidth allocated for the service associated with the failure mode.

11. The method according to claim 1, further comprising:
determining whether the corrective action resolved the failure mode of the network link; and
selecting iteratively an additional corrective action to be taken from a predetermined list of successive corrective actions.

12. The method according to claim 1, wherein determination of whether a failure mode of the network link has occurred comprises one or more of:
determining whether service level agreement requirements associated with the one or more services have been met;
determining whether quality of service guarantees associated with the one or more services have been met;
determining whether bandwidth usage for any service of the one or more services exceeds a threshold bandwidth for that service; and
determining whether a total bandwidth usage by all services of the one or more services is greater than or equal to a total bandwidth of the network link.

13. The method according to claim 1, wherein the selection of the corrective action to be taken is different as the frequency of occurrence of the failure mode increases.

14. A system comprising:
a monitoring device configured to monitor traffic over the network link provides one or more services to one or more customers; and
an analysis module configured to determine whether a failure mode of the network link has occurred by comparing the monitored traffic data to predetermined bandwidth criteria, and to select a corrective action to be taken in response to the failure mode,
wherein the comparison of the monitored traffic to the predetermined bandwidth criteria is performed on a service-by-service basis, wherein the monitored traffic for each of the one or more services is compared to predetermined bandwidth criteria associated with the service,
wherein types of the failure mode are determined based on a proportion of the one or more services with respect to which the monitored traffic fails to satisfy the associated predetermined bandwidth criteria, wherein the failure mode types comprise a one failure mode determined when at least one service and fewer than all services provided to at least one of the customers fail to satisfy associated service requirements, and another failure mode determined when all services provided to at least one of the customers fails to satisfy associated service requirements,
wherein selection of the corrective action to be taken is determined based on the failure mode type, and
wherein said analysis module is configured to select the corrective action to be taken further based on a frequency of occurrence of the failure mode.

15. The system according to claim 14, wherein said analysis module is configured to select the corrective action to be taken further based on a customer service level agreement category assigned to a customer associated with the failure mode.

16. The system according to claim 14, wherein the predetermined bandwidth criteria comprises one or more of service level agreement requirements associated with the one or more services, quality of service guarantees associated with the one or more services, and bandwidth threshold values associated with the one or more services.

17. The system according to claim 14, wherein said analysis module is configured to select a different corrective action to be taken as the frequency of occurrence of the failure mode increases.

18. The system according to claim 14, wherein the analysis module is further configured to:
determine whether the corrective action resolved the failure mode of the network link; and select iteratively an additional corrective action to be taken from a predetermined list of successive corrective actions.

19. The system according to claim 14, wherein determination of whether a failure mode of the network link has occurred comprises one or more of:
   determining whether service level agreement requirements associated with the one or more services have been met;
   determining whether quality of service guarantees associated with the one or more services have been met;
   determining whether bandwidth usage for any service of the one or more services exceeds a threshold bandwidth for that service; and
   determining whether a total bandwidth usage by all services of the one or more services is greater than or equal to a total bandwidth of the network link.

20. The method according to claim 14, wherein the failure mode types further comprise one or more of:
   a first failure mode type determined when at least one customer of the one or more customers is not receiving a service level agreement requirement for at least one service of the one or more services, but not for all services of the one or more services;
   a second failure mode type determined when at least one customer of the one or more customers is not receiving a service level agreement requirement for all services of the one or more services;
   a third failure mode type determined when a quality of service guarantee is not met for at least one service of the one or more services, but not for all services of the one or more services;
   a fourth failure mode type determined when a quality of service guarantee is not met for all services of the one or more services;
   a fifth failure mode type determined when a bandwidth usage for at least one service of the one or more services exceeds a threshold bandwidth for the at least one service, but a total bandwidth usage by all services of the one or more services is less than a total bandwidth of the network link; and
   a sixth failure mode type determined when a bandwidth usage for at least one service of the one or more services exceeds a threshold bandwidth for the at least one service, and a total bandwidth usage by all services of the one or more services is greater than or equal to a total bandwidth of the network link.

21. The method according to claim 14, wherein the corrective action comprises one or more of:
   a first corrective action including determining that no action is required in response to the failure mode;
   a second corrective action including increasing service level agreement bandwidth for a customer associated with the failure mode;
   a third corrective action including increasing a quality of service priority setting for a service associated with the failure mode;
   a fourth corrective action including increasing allocated bandwidth for a service associated with the failure mode;
   a fifth corrective action including decreasing an over-subscription factor assigned to a service associated with the failure mode; and
   a sixth corrective action including replacing the network link with a higher capacity network link, and/or introducing one or more additional network links.

\* \* \* \* \*